United States Patent [19]

Coffman et al.

[11] Patent Number: 4,805,827

[45] Date of Patent: Feb. 21, 1989

[54] METHOD OF SOLDERING WITH HEATED FLUID AND DEVICE THEREFOR

[75] Inventors: Bradford W. Coffman, Baltimore; William J. Siegel, Silver Spring, both of Md.

[73] Assignee: Pace Incorporated, Laurel, Md.

[21] Appl. No.: 92,469

[22] Filed: Jul. 15, 1987

Related U.S. Application Data

[63] Continuation of Ser. No. 790,448, Oct. 23, 1985.

[51] Int. Cl.⁴ .................................................. B23K 1/12
[52] U.S. Cl. ......................................... 228/20; 228/242
[58] Field of Search ............... 228/119, 240, 242, 264, 228/6.2, 20 R, 20 HT, 180.2, 44.7; 219/373; 285/319

[56] References Cited

U.S. PATENT DOCUMENTS

| 620,497 | 2/1899 | Reinisch | 285/319 |
|---|---|---|---|
| 3,524,247 | 8/1970 | Goldschmeid | 228/242 |
| 3,676,911 | 7/1972 | Austin | 228/44.7 |
| 4,295,596 | 10/1981 | Doten et al. | 228/242 |
| 4,552,300 | 11/1985 | Zovko et al. | 228/242 X |
| 4,561,584 | 12/1985 | Hug | 228/119 |
| 4,564,135 | 1/1986 | Barresi et al. | 228/180.2 X |
| 4,605,152 | 8/1986 | Fridman | 228/20 R |
| 4,610,388 | 9/1986 | Koltuniak et al. | 228/20 R X |
| 4,620,659 | 11/1986 | Holdway | 228/20 R |

FOREIGN PATENT DOCUMENTS

113254 9/1979 Japan .................................. 228/6.2

OTHER PUBLICATIONS

Colderwood, AT&T Technical Digest No. 75, Sept. 1984, p. 11.

Crawford, IBM Technical Disclosure Bulletin, vol. 22, No. 5, Oct. 1979, pp. 1833-1838.

Trollman, IBM Technical Disclosure Bulletin, vol. 11, No. 10, Mar. 1969, pp. 1289.

Kristiansen, IBM Technical Disclosure Bulletin, vol. 11, No. 5, Oct. 1968, pp. 482.

Primary Examiner—Kenneth J. Ramsey
Attorney, Agent, or Firm—Gerald J. Ferguson, Jr.

[57] ABSTRACT

Device for delivering heated fluid to the sides of a component to melt solder at terminals disposed at the periphery of the component. The device includes a nozzle for delivering heated fluid generally in a first direction to the sides of the component, and a baffle disposed within or above the nozzle for directing the heated fluid generally laterally with respect to the first direction prior to delivery of the heated fluid toward the sides of the component. The nozzle has downwardly extending sides, and the sides are dimensioned so that the component can be accommodated within the nozzle. The baffle produces good distribution and mixing of heated air above and about the terminals, and this avoids the generation of hot spots, and produces simultaneous or essentially simultaneous melting of the solder at all of the leads to facilitate quick and convenient attachment of the component to or removal of the component from a printed circuit board. The downwardly extending sides of the nozzle are preferably vertically oriented with respect to the printed circuit board while the lower edges thereof are disposed at least below the body of the component such that heated fluid is forced through a constricted space as it passes the component terminal to thus optimize transfer of heat from the fluid to the solder at the terminals.

22 Claims, 4 Drawing Sheets

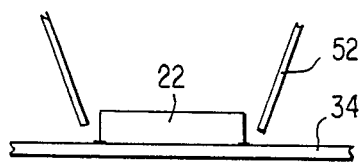
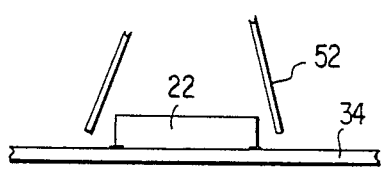
FIG. 5        FIG. 6
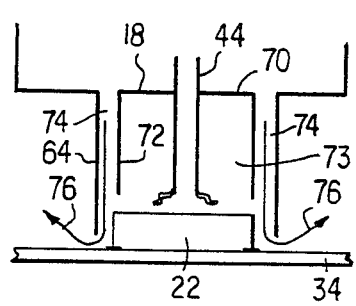
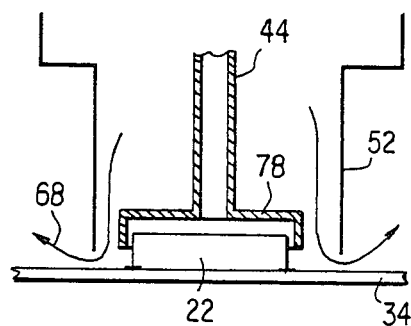
FIG. 7        FIG. 8
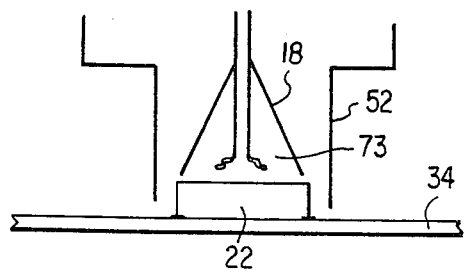
FIG. 9

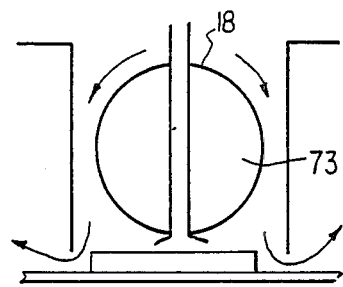
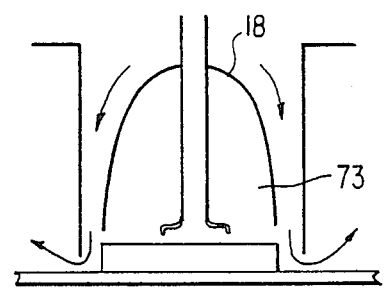
FIG. 10          FIG. 11
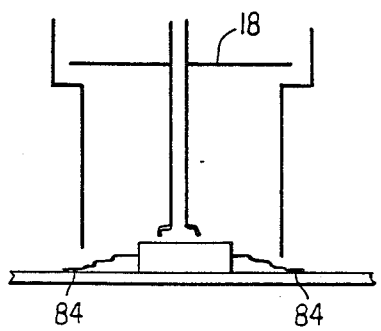
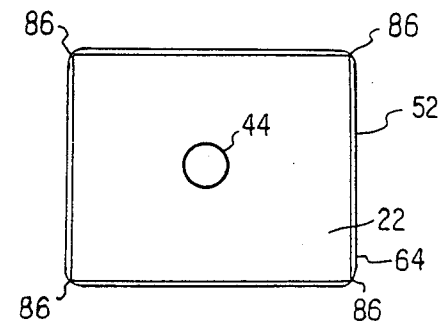
FIG. 12          FIG. 13

METHOD OF SOLDERING WITH HEATED FLUID AND DEVICE THEREFOR

This is a continuation application of Ser. No. 790,448, filed Oct. 23, 1985, now abandoned.

The present invention relates to a device for delivering heated fluid, such as air, to the sides of a component to melt solder at terminals disposed at the periphery of the component.

BACKGROUND OF THE INVENTION

Devices suitable for use in removing or installing modular electronic components from a substrate such as a printed circuit board include those which direct heated air at the terminals of the component from a source of heated air above the component to simultaneously melt the solder on each of the terminals. Examples of such devices are disclosed in U.S. Pat. Nos. 4,295,596 and 4,366,925. The devices in each of those two patents operate by directing hot air onto the terminals of a component, followed by removal of the component either mechanically or by the application of suction.

A disadvantage associated with the prior devices is that heated air is not delivered uniformly to the terminals, and this results in the generation of hot spots in the region of the terminals and non-uniform melting of the solder. In light of this, removal of the components is often hindered due to the fact that the solder at one or more of the terminals is not melted when the solder at the remaining terminals is melted, and removal of the component under these circumstances is often accompanied by damage to the component, the leads and/or the printed circuit board.

It is therefore an object of the present invention to provide an improved device for delivering heated fluid to the sides of the component to uniformly melt solder at terminals disposed at the periphery of the component to facilitate clean installation or removal of the component from a substrate.

It is another object of the present invention to provide an improved device of the above type incorporating a nozzle member and a baffle member disposed above or within the nozzle member for obtaining good distribution and mixing of heated air about the terminals in order to avoid the generation of hot spots and to ensure simultaneous melting of solder at all of the terminals to enable easy removal of the component from or installation of the component on a printed circuit board.

It is a further object of this invention to provide a constricted passageway to the heated fluid at the location of the terminals to facilitate rapid and effective heat transfer from the heated fluid to the solder to be melted at the terminals.

It is another object of the present invention to provide an improved nozzle suitable for use in conjunction with a device of the above type in the installing and removal of electronic components from circuits printed on a substrate.

SUMMARY OF THE INVENTION

According to one aspect of the present invention, there is provided a device for delivering heated fluid, typically heated air, to the sides of a component to melt solder or the like at terminals disposed at the periphery of the component in order to facilitate installation of the component on or removal of the component from, a substrate, for example a printed circuit board. The device comprises a nozzle means for delivering heated fluid generally in a first direction to the sides of a component, and a baffle means disposed above or within the nozzle means for directing heated fluid generally laterally with respect to the first direction prior to delivery of the heated fluid towards the sides of the component. The presence of the baffle means provides for good distribution and mixing of the heated air about the terminals in order to avoid the generation of hot spots, and to ensure the substantially simultaneous melting of solder at all of the terminals in order to facilitate easy and clean installation or removal of the component from the board.

The baffle means preferably includes a baffle plate extending laterally with respect to the nozzle, with the baffle plate including at least one aperture disposed near a peripheral edge of the baffle plate to produce the desired distribution and mixing of heated air prior to delivery of the heated air towards the terminals of the component. According to a preferred embodiment, the baffle plate includes four equi-spaced apertures each disposed near a peripheral edge of the baffle plate.

The nozzle means has a downwardly extending side plates, and those side plates are preferably parallel to each other, or may be downwardly divergent or downwardly convergent with respect to each other. In the preferred embodiment where the side plates are parallel to each other, the perimeter of the lower opening of the nozzle means is slightly greater than that of the component to be removed or installed so that a constricted passageway for the heated fluid is provided at the terminals to facilitate effective transfer of the heat from the heated fluid to the solder to be melted at the terminals.

According to another embodiment of the invention, the nozzle means includes a locating means for locating a component within the nozzle in a particular predetermined orientation. According to one embodiment, the locating means comprises a radiused portion disposed at at least three corners of the nozzle means.

BRIEF DESCRIPTION OF THE DRAWINGS

The invention of the present application will now be described in more detail with reference to preferred embodiments, given only by way of example, and with reference to the accompanying drawings, in which:

FIGS. 5 and 6 are schematic side elevations of alternative embodiments of the present invention;

FIGS. 7 through 11 are alternative embodiments of baffle means usable in the device of the present invention;

FIG. 12 is a schematic side elevation of a further embodiment of the device of the present invention; and FIG. 13 is a plan view of a nozzle of the present invention showing a locating means.

DETAILED DESCRIPTION OF THE INVENTION

The component removal/installation device of the present invention is particularly suited for use in conjunction with the device described and claimed in co-pending application Ser. No. 649,065 filed Sept. 10, 1984, now U.S. Pat. No. 4,659,004, and the entire disclosure of that application is hereby incorporated by reference into the present application.

In the following description, reference will be made to air as the fluid being heated. However, it will be appreciated that the invention is not limited to the use of air, and other fluids such as inert gases, including nitrogen, argon and carbon dioxide, may be used, if desired.

Figure 1:
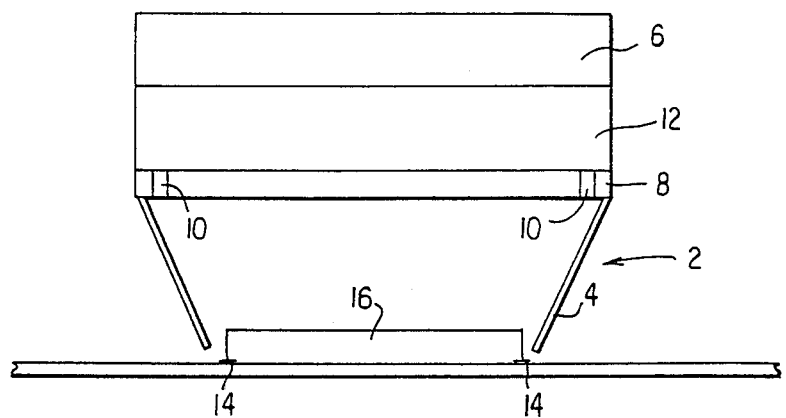
FIG. 1 is a schematic side elevation of an earlier component removal/installation arrangement.

Referring, now, to the drawings, FIG. 1 shows schematically, the component removal/installation arrangement described in co-pending application Ser. No. 742,702 filed June 7, 1985, now U.S. Pat. No. 4,687,907. For completeness, the entire disclosure of that application is hereby specifically incorporated by reference into the present application. The arrangement shown in FIG. 1, and generally referenced 2, comprises a nozzle 4, a heated device 6 and an orifice plate 8 haveing a plurality of orifices 10 extending around the periphery of the orifice plate. The heater device 6 is separated from the orifice plate 8 to provide a plenum 12, and heated air, which is heated by the heater device 6, passes from the plenum 12 through the orifices 10 into the nozzle 4 and ultimately reaches the terminals 14 of the component 16 in order to effect melting of solder or the like at the terminals.

Turning to FIGS. 2 through 10, which illustrate embodiments of the component removal/installation device of the present application, the orifice plate 8 illustrated in FIG. 1, is replaced by a baffle member 18 for directing heated air entering above the baffle plate generally laterally, as indicated by arrows 20 prior to delivery of heated air towards component 22. In the embodiment illustrated in FIG. 2, air is heated by a heated device 24, and enters into region 26 above the baffle member 18 through entry port 28. In the region 26, the heated air is directed generally laterally as indicated by the arrow 20, and then descends towards the component 22 as indicated by the arrows 30. This lateral deflection of heated air prior to delivery towards the component 22 produces good mixing and distribution of the air about terminals 32 of the component 22, and thereby avoids the formation of hot spots and non-uniform melting of solder at the terminals 32. A primary objective of the device of the present invention is to achieve simultaneous or substantially simultaneous melting of solder at the terminals 32 in order to enable quick and clean removal of the components from the printed circuit board 34, in order to minimize damage to the component 22, the terminals 32 and/or board 34. The uniform distribution and mixing of heated air by the nozzle device of the present invention also facilitates clean and easy installation of a component onto a printed circuit board, and this aspect of operation of the device of the present application is discussed in more detail below.

Figure 2:
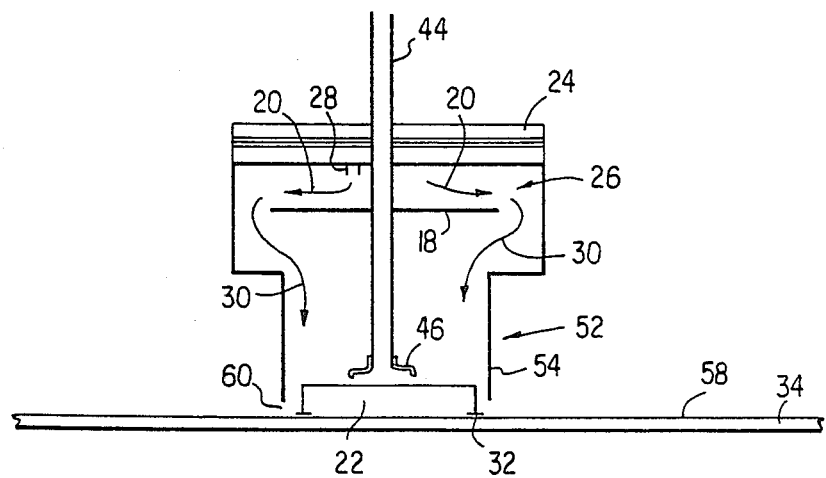
FIG. 2 is a schematic side elevation of a component removal/installation device of the present invention.
Figure 3:
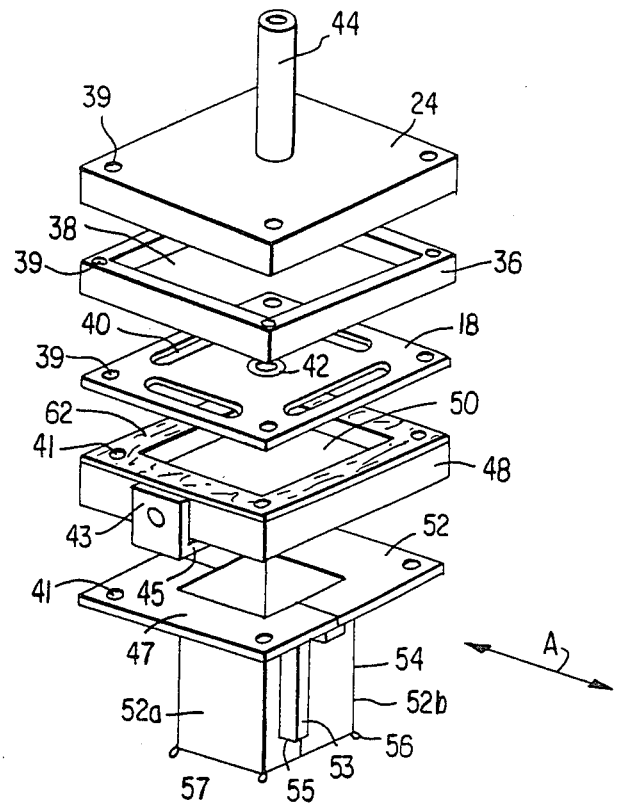
FIG. 3 is a perspective exploded view of a device of the present invention.

FIG. 3 shows an exploded perspective view of a preferred construction of the device of the present invention. The heater device 24 may be any suitable device for heating air, and is preferably the heater device described and claimed in the above-mentioned co-pending application Ser. No. 742,702. The heater device 24 is connected to a spacer member 36 having an opening 38 through which heated air passes towards baffle member 18. Baffle member 18 may comprise a plate, preferably by having elongated apertures 40 disposed about the edge of the baffle plate 18. A central aperture 42 is provided for receiving a vacuum conduit 44 for removing a component from the printed circuit board 34 following melting of the solder at the terminals 32 or for holding a component prior to installation on the printed circuit board. The vacuum conduit 44 is connected to a source of vacuum (not shown), and is provided with a suction cup 46 (FIG. 2) in order to ensure good attachment of the component 22 to the vacuum conduit 44.

The baffle member 18 is connected to a separator plate 48 having an opening 50 through which heated air passes following lateral deflection by the baffle member 18. The separator plate 48 is connected to nozzle 52 having a heated air delivery conduit 54 through which heated air passes towards the terminals 32 of the component 22. According to a preferred arrangement, the heated air delivery conduit 54 may be provided with spacer elements 56 in order to maintain the nozzle 52 at a desired distance above the upper surface 58 of the printed circuit board 34 so that heated air can exit through aperture 60 (FIG. 4) after contacting and heating the solder at the terminals 32. In order to ensure good delivery of heated air from the heater device 24 through the baffle member 18 and the nozzle 52, a sealing member 62 is provided on an upper surface of the apertured separator plate 48. This sealing member can be of any suitable sealing material, for example an asbestos-containing material.

Figure 4:
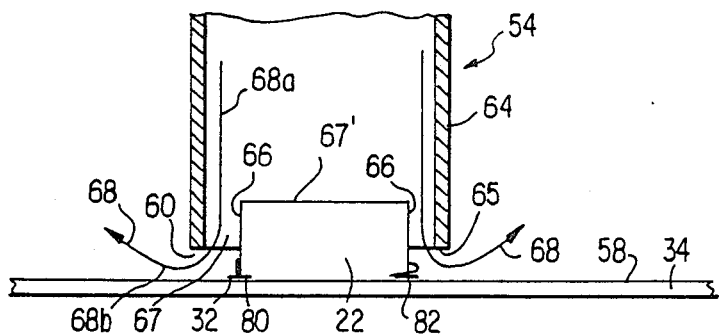
FIG. 4 is an enlarged view of a portion of the device illustrated in FIG. 2.

FIG. 4 illustrates schematically the desired flow of heated air past the terminals 32 of the component 22. A constricted passageway for the heated air because the side members 64 of the heated air delivery conduit 54 are close to the sides 66 of the component 22 as well as to the upper surface 58 of the printed circuit board 34. Preferably, in order to establish this effect, the walls 64 should be parallel (that is, substantially vertically oriented with respect to board 34). Moreover, the lower edge 65 of the nozzle should be disposed at least below the upper surface 67 of the component 22.

The baffle member 18 laterally disperses and distributes the heated air to all sides of the component, and there is substantially no interference (such as tends to occur with the apertures 10 illustrated in FIG. 1) with the flow of heated air towards the sides 66 of the component 22. Thus, the heated air delivery conduit 54 is configured so that heated air passes the terminals 32 as shown by the arrow 68 to effect heat transfer from the heated air to the solder at the terminals 32. As discussed below, the terminals 32 may be below the body of component 22 or extend laterally from the sides of the component 22.

Due to the spacing of the sidewall from the side of the component and the spacing of the lower edge of the nozzle from the board, melting of the solder of adjacent components is avoided. That is, most of the heat in the heated air is transfered to the solder to be melted. Thus, when it finally exits from under the lower edge of the nozzle, it mixes with the ambient air thus dropping its temperature. Further, the spacing of the lower edge from the board may preferably be such as to act as a control on the flow of the heated air as it passes the terminal and thus insure sufficient heat is transferred to the solder to be melted. In general, the spacing between the nozzle wall and the side of the component is preferably about 5–50 mils as is the spacing of the lower edge of the nozzle from the board where it should be understood spacings outside this range may also be employed. The ratio of the spacings will depend on the particular component where in some instances the spacing of the wall from the side of the component will be greater than the spacing between the lower edge of the nozzle and the board while, in other instances, the reverse will be true, again depending on the particular component. In general, closeness of the sidewall to the component contributes to even reflow while closeness of the lower edge of the nozzle to the board contributes to air flow control.

From the above discussion, it will be appreciated that the design of the device of the present invention is intended to provide uniform mixing of heated air together with even distribution of the heated air between the nozzle and the sides of the component in order to effect simultaneous or substantially, simultaneous melting of the solder at the terminals of the component.

FIGS. 5 and 6 show alternative embodiments for the shape of the nozzle 54. The parallel sided nozzle configuration shown in FIGS. 2 through 4 is preferred, as stated above, but it is possible, according to the invention, to utilize different nozzle shapes, such as the downwardly convergent configuration shown in FIG. 5 or the downwardly divergent configuration shown in FIG. 6.

In referring to FIG. 3, the heated device 24, spacer member 36, and baffle member 18 typically are connected to one another and form a portion of a heater unit such as heater unit 174 (FIG. 11) of the above mentioned co-pending application Ser. No. 649,065. Accordingly, these members may be connected together via the apertures 39.

Moreover, the separator plate 48 and nozzle 52 may also be fixedly connected to baffle 18 via apertures 41. However, it is preferable that the separator plate and nozzle being moveable as a unit with respect to the above mentioned heater unit. Thus, separator plate 48 and nozzle 52 typically would be incorporated in a nozzle locator unit such as unit 176 (FIG. 17) of co-pending application Ser. No. 649,065 where separator plate 48 and nozzle 52 of the present invention would respectively correspond to separator plate 180 and nozzle 178 of the above co-pending application. Moreover, when the separator plate and nozzle are moveable as a unit with respect to the heater unit, it can be seen the sealing member 62 is effective to maintain a fluid seal when the nozzle locator unit is positioned adjacent the heating unit.

Not only is the nozzle locator unit including separator plate 48 and nozzle 52 moveable with respect to the heating unit but also the nozzle is typically removeable from the nozzle locator unit. Thus, different size nozzles may be employed to accommodate different size components. As shown in FIG. 3, spring clips 43 may be disposed at opposite sides of separate plate 48, the clips having inwardly extending portions 45 for retaining the flange 47 of nozzle 52 in place whereby the nozzle is slideably inserted or removed in the direction of arrow A. The spring clips 43 may correspond to those shown at 378 in FIG. 17 of co-pending application Ser. No. 649,095.

As discussed in the foregoing application, one of the reasons for making the nozzle locator unit 176 movable with respect to the heater unit is to facilitate accurate orientation of the component with respect to the heating unit. This is effected by the operator viewing the component through the nozzle (when the nozzle locator unit is separated from the heater unit) and adjusting the position of the component until it is symmetrically positioned within the lower opening of the nozzle. This is facilitated in the foregoing co-pending application by making the perimeter of the nozzle's lower opening slightly greater than that of the component. This is further facilitated in the preferred embodiment of this invention due to the substantially vertical orientation of the side walls 64 of the nozzle with respect to board 34 whereby very accurate orientation can be effected either by the unaided eye or with a microscope.

The parallel sided nozzle of the present invention has further features including ease of manufacturing. That is, it is easier to manufacture such a nozzle compared to the slanted wall nozzles of FIGS. 5 and 6. Moreover, rectangular openings at the lower end of the nozzle can be readily incoporated. To manufacture a nozzle with such an opening having slanted walls is quite difficult. Moreover, the rectangular opening may be oriented either in the position shown in FIG. 13 or in a position orthogonal thereto. Thus, different orientations of rectangular components can be readily accommodated. Preferably, when the lower opening is rectangular, the outer perimeter of flange 47 (FIG. 3) of the nozzle is square. Thus, any orientation of a rectangular component is more readily accommodated by simply rotating the nozzle through 90° (if necessary) before inserting it into spring clips 43 of separator 48.

The nozzles 52 are preferably fabricated from two generally U-shaped members 52a and 52b (FIG. 3) which are held together by a strap 53 typically spot welded to members 52a and 52b. Preferably, the strap terminates at a point 55 above the lower edge 57 of the nozzle. This point is above the upper surface of the components and is typically ⅛" above the lower edge 57. Thus, the nozzle may more readily be inserted between closely spaced components on the board. That is, only the thickness of the sidewall 64 is inserted between the componets due to the termination of strap 53 at point 55.

In general, further characteristics the nozzle should have are low thermal conductivity, high temperature capability, and structural stability. A material such as stainless steel is suitable since it has the above characteristics even when made quite thin. In general, the nozzle wall thickness is preferably 5–25 mils where the thinner the wall, the better, the wall thickness being limited by structural stability. Wall thicknesses other than those in the preferred range stated above may also be employed in suitable applications. If the wall may contact the solder as in the FIG. 12 embodiment, the wall should also have the characteristics of non-solderability and be non-contaminating to the solder. Again, a material such as stainless steel fulfills this requirement.

Other features of the nozzle will be described below with respect to FIGS. 12 and 13.

FIGS. 7 through 11 illustrate alternative embodiments of the baffle member 18. In FIG. 7, the baffle member 18 is connected to vacuum tube 44 and has an upper surface 70 and downwardly depending side members 72 forming passageways 74 between the sides 64 and the side member 72. Heated air is delivered towards the terminals 32 along the passageways 74 as indicated by the arrows 76.

FIG. 8 shows an embodiment in which the baffle member 18 generally corresponds to vacuum tube 44 such that the tube is configured so that it is closely over the upper surface of the component 22. In this way, the baffle member serves both to deflect and mix heated air laterally prior to delivery to the leads 32, while also serving to form a suction member 78 connected to the vacuum conduit 44 for removing or installing the component. Moreover, the FIG. 8 construction of the suction member 78 may act as a heat shield for the component.

In FIG. 9, the baffle member 18 has an external conical configuration, and in the embodiment illustrated in FIGS. 10 and 11, the baffle member 18 has an external upwardly curved surface. In FIG. 10, the baffle member is spherical, and in FIG. 11, the baffle member is parabolic, each of the baffles of FIGS. 9–11 being connected to the vacuum tube.

In the embodiments of FIGS. 7, 9, 10 and 11, the baffle member 18 encloses a substantial portion 73 of the space within the nozzle. This is a desirable feature as can be seen from a comparison with the embodiment of FIG. 4. In FIG. 4, the air within space 73 of the nozzle must be brought to solder melting temperature and thus there is a finite time delay before this occurs. This delay is shortened or substantially eliminated in the embodiments of FIGS. 7, 9, 10 and 11 since the air enclosed in space 73 need not be heated to solder melting temperature since it is not involved in the melting of the solder.

In general, any filler material such as plastic may be mounted on tube 44, for example, in the configuration of the baffle member of FIG. 7 to avoid the necessity of heating the air within the nozzle.

The embodiments discussed above are suitable for removing or installing components of any type, such as components which are leadless (see numeral 80 in FIG. 4), or J-leaded components (see numeral 82 in FIG. 4). The embodiment illustrated in FIG. 12, on the other hand, is particularly suited for installing or removing components having external leads, for example "gull wing" terminals, such as those shown schematically in FIG. 12. In this particular embodiment, the side members 64 of the nozzle 52 are dimensioned such that heated air contacts soldered regions 84 which are somewhat more remote from the sides of the component 66 than in the embodiments illustrated in FIG. 4. With the arrangement shown in FIG. 12, it is possible to melt the solder at the regions 84 and then to bring the sides of the nozzle 64 into contact with the molten solder in order to compress the solder and effect a complete seal. It is to be emphasized that although the invention has been described with respect to components of the above type, there is no limitation as to the type of component which may be processed with the present invention. Thus, the components may also have leads to the reverse J-type, post (or stilted) type, flat-pac type, etc.

In general, it can be seen that with the parallel sided nozzle of the present invention, not only is a constricted passageway (formed between the nozzle sidewall and the side of the component) 67 (FIG. 4) for the heated air provided air is provided for leadless and J-leaded components but also the extent of the passageway is effectively increased with respect to slanted wall nozzles. As can be seen in FIG. 4, the heated air has a substantially vertical component 68a as it passes the solder to be melted and a substantially horizontal component 68b as it passes beneath the lower edge of the sidewall. It is thought the vertical component 68a is more effective with leadless and J-leaded components and the like while the horizontal component 68b is more effective with extended lead components as in the FIG. 12 embodiment and the like although there is no intent to be limited to a particular theory of operation.

It should also be noted the embodiment of FIG. 8 is also very suitable for use with extended lead components where region 84 of FIG. 12 may be positioned, for example at 84a of FIG. 8.

FIG. 13 illustrates an embodiment of the invention which incorporates a locating means for locating a component within the nozzle in order to facilitate accurate positioning for installation on a printed circuit board. The locating means comprises at least one shaped corner 86 of the lower opening nozzle 52 where the shape of the corner may be radiused (or rounded), chopped off in a staight line (beveled) or any other shape which will effect the various purposes discussed below. Each corner may be such that the component 22 can only touch the nozzle at the corners, and not on the sides of the component. Since many components have one or more corners chopped off for orientation purposes, it is possible to provide only one of the four corners with a shaped portion 86. However, it is equally possible to provide all four corners with a radiused portion and such an embodiment is shown in FIG. 13. The component 22 slides freely into the nozzle 52, but the radiused portions 86 prevent the lead from touching the sides 64. In general, as long as the component can slide freely within the nozzle with or without shaping of the corners, even reflow can be insured. However, the shaped corner(s) described above will be an aid in effecting this condition. The component to be installed is held within the nozzle 52 by the vacuum conduit 44 until placed onto the board prior to installation. In this way, with the orientation of the component 22 fixed with respect to the nozzle 52, the only step which is required is to properly orient the printed circuit board with respect to the nozzle in order to achieve correct alignment of the terminals of the component 22 with the contacts on the printed circuit board. Note also the rounded corners prevent air flow at the corners. Since there are usually no terminals at the corners of a component, this directs more of the heated air to the sides of the component where the terminals are located.

An alternative possibility for locating components with respect to the nozzle 52 is to utilize the vacuum conduit 44. This would require adaptation of the vacuum conduit to make it non-rotational with respect to the nozzle, and this could be readily achieved by use of a suitable keying arrangment (not shown).

It has been found that components can be quickly and cleanly removed from a printed circuit board utilizing the device of the present invention. The nozzle configuration and baffle member give rise to uniform mixing and distribution of heated air about the terminals. The spacing between the sides of the component and the inner surfaces of the nozzle provide substantially simultaneous melting of the solder at all of the terminals occurs without significant overheating of the component itself, the board or adjacent components.

We claim:

1. In combination, an electronic component, a substrate and a device for effectuating the removal or installation of said electronic component by the delivering of heated fluid along the sides of said electronic component to melt solder at terminals disposed at the periphery thereof, said device comprising means for generating a flow of said heated fluid and nozzle means removably mounted in association with said means for generating and said electronic component for receiving the flow of said heated fluid from the means for generating and for passing it along the sides of said electronic component while maintaining a pocket of cooler fluid above said electronic component;

wherein said nozzle means consists of a tube having four side plates of a metallic material having a low thermal conductivity, high temperature capability and structural stability, said side plates being connected together into a rectangular parallelepiped having a hollow interior space completely spanning the distance between said plates;

wherein said electronic component is disposed within said interior space in a manner creating a means for evenly distributing said flow of heated fluid along side walls of the component by defining a constricted passageway between the each side plate and a respective side wall of the electronic component that has a width, between each respective side plate and side wall of the component, in a range of 5–50 mils; and wherein said nozzle means is oriented with said side plates extending normal to said substrate in a manner creating a means for controlling the transfer of heat to said terminas from the fluid flow exiting said nozzle means, by a lower edge of the side plates being spaced from the substrate by a distance within a range of 5–50 mils.

2. A combination as in claim 1 including a baffle member disposed between said means for generating and said component for directing the heated fluid generally laterally toward said downwardly extending side plates and then through at least one extended opening prior to delivery of the heated fluid to the constricted passageway.

3. A combination according to claim 2, wherein said baffle member includes a vacuum suction means for removing said component from a substrate or holding a component during installation of a component on a substrate.

4. A combination according to claim 2, wherein said nozzle means includes locating means for locating said component in relation to said nozzle means.

5. A combination according to claim 4, wherein said locating means comprises at least one shaped portion at a corner of the lower opening of said nozzle means.

6. A combination as in claim 5 including a pair of hollow spacer means respectively disposed between (a) said means for generating and said baffle member and (b) said baffle member and said nozzle means.

7. A combination as in claim 1 where said nozzle means includes a flange connected to said side plates and extending around said upper opening.

8. A combination as in claim 7 where the nozzle means includes means for removably engaging said flange.

9. A combination as in claim 8 where said means for removably engaging said flange includes pair of spring clips.

10. A combination as in claim 7 where said flange is square.

11. A combination as in claim 1 where said combination includes a vacuum tube extending through said nozzle means, said tube applying vacuum to said component.

12. A combination as in claim 1 where said lower opening of said nozzle means is rectangular.

13. A combination as in claim 12 where said nozzle means includes a flange extending around the upper opening thereof, the outer perimeter of the flange being square in configuration whereby said nozzle means may be inserted into said device in either one of two orthogonal orientations to accommodate rectangular components having different orthogonal orientations with respect to each other on said substrate.

14. A combination as in claim 1 where said nozzle means includes spacer means disposed at the lower edge thereof to facilitate spacing of the nozzle means with respect to the substrate.

15. A combination as in claim 1 where said nozzle means includes rounded corners to substantially prevent the heated fluid from contacting the corners of the component.

16. A combination as in claim 1 where said nozzle means includes two mating, substantially U-shaped members and an elongated strap bonded to and connecting said members together, said strap extending along at least a portion of the line where the two members mate.

17. A combination as in claim 16 where said strap terminates at its lower end at a point above said component to facilitate the insertion of said nozzle means between closely spaced adjacent components.

18. A combination as in claim 17 where said lower end of said strap terminates about ⅛ inch above the lower edge of the nozzle.

19. A combination as in claim 1 where said component is of the leadless type.

20. A combination as in claim 1 where said component is of the J-leaded type.

21. A combination as in claim 1 where said component is of the gull-wing-leaded type.

22. A method of effectuating the removal or installation of an electronic component on a substrate by the delivery of heated fluid along the sides of the electronic component to melt solder at terminals disposed at the periphery thereof comprising the steps of:

(A) providing a nozzle consisting of a tube having four side plates, of a metallic material of low thermal conductivity, high temperature capability, and structural stability, connected together into a rectangular parallelepiped having a hollow interior space completely spanning the distance between said plates;

(B) delivering a flow of heated fluid into said interior space;

(C) disposing said electronic component within said interior space in a manner defining a constricted passageway, between each side plate and a respective side wall of the component, the passageway having a width, between the respective side plate and side walls of the electronic component, in a range of 5–50 mils for evenly distributing said flow of heated fluid along the side wall of the component while maintaining a pocket of cooler fluid above said component;

(D) orienting said nozzle with said side plates extending normal to the substrate and controlling the transfer of heat to said terminals, from the fluid flow exiting the said nozzle, by spacing a lower edge of the side plates of the nozzle from the substrate at a distance within a range of 5–50 mils.

* * * * *